United States Patent

Adachi

(10) Patent No.: US 11,289,826 B2
(45) Date of Patent: Mar. 29, 2022

(54) ELECTRIC WIRE CONNECTION STRUCTURE AND CONNECTION METHOD

(71) Applicant: YAZAKI CORPORATION, Tokyo (JP)

(72) Inventor: Hideki Adachi, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/171,855

(22) Filed: Feb. 9, 2021

(65) Prior Publication Data

US 2021/0249796 A1 Aug. 12, 2021

(30) Foreign Application Priority Data

Feb. 10, 2020 (JP) .............................. JP2020-020624

(51) Int. Cl.
*H05K 1/00* (2006.01)
*H01R 4/18* (2006.01)
*H01R 4/02* (2006.01)
*H01R 11/11* (2006.01)
*H01R 25/16* (2006.01)

(52) U.S. Cl.
CPC .............. *H01R 4/187* (2013.01); *H01R 4/02* (2013.01); *H01R 11/11* (2013.01); *H01R 25/16* (2013.01)

(58) Field of Classification Search
CPC ......... H05K 1/0206; H01R 4/18; H01R 4/187
USPC ......................................................... 174/252
See application file for complete search history.

(56) References Cited

U.S. PATENT DOCUMENTS

| | | |
|---|---|---|
| 9,837,727 B2 * | 12/2017 | Schmalbuch .......... H01R 12/53 |
| 10,297,956 B2 * | 5/2019 | Abouklassem .... H01R 13/6583 |
| 10,511,104 B2 * | 12/2019 | Gleisberg ............... H01R 4/024 |
| 2011/0165800 A1 * | 7/2011 | Kakuta ..................... H01R 4/62 439/880 |
| 2015/0236431 A1 * | 8/2015 | Schmalbuch ........ H01Q 1/3291 174/250 |
| 2015/0264800 A1 * | 9/2015 | Schmalbuch ............ H05K 1/09 174/257 |
| 2016/0064717 A1 | 3/2016 | Nishimura et al. |
| 2019/0148843 A1 | 5/2019 | Idota et al. |

FOREIGN PATENT DOCUMENTS

| | | |
|---|---|---|
| JP | 2016-48635 A | 4/2016 |
| WO | 2018/220902 A1 | 12/2018 |

* cited by examiner

*Primary Examiner* — Phuong Chi Thi Nguyen
(74) *Attorney, Agent, or Firm* — Kenealy Vaidya LLP (57) ABSTRACT

A connection structure for an electric wire includes an electric wire that has a conductor and an outer sheath covering the conductor; a bonding member that is made of a conductive metal material and is attached to the electric wire and; and a busbar that is made of a conductive metal material and on which the bonding member is overlapped and ultrasonically bonded with the conductor interposed between the busbar and the bonding member. The bonding member includes a crimping portion for crimping and fixing the electric wire.

4 Claims, 11 Drawing Sheets

ELECTRIC WIRE CONNECTION STRUCTURE AND CONNECTION METHOD

CROSS-REFERENCE TO RELATED APPLICATIONS

This application is based on and claims priority under 35 USC 119 from Japanese Patent Application No. 2020-020624 filed on Feb. 10, 2020, the contents of which are incorporated herein by reference.

TECHNICAL FIELD

The present invention relates to a connection structure for an electric wire and a connection method of an electric wire.

BACKGROUND ART

For example, it is known that, as a technology for connecting an electric wire such as a voltage detection line to a busbar of a busbar module to be assembled to a battery, an extended portion is formed in a connected portion of the busbar, and a conductor of the electric wire held by bending the extended portion is ultrasonically bonded (see, for example. Patent Literature 1).

CITATION LIST

Patent Literature

Patent Literature 1: JP-A-2016-48635

For example, when an electrode of the battery is aluminum, the busbar of the busbar module is also preferably made of aluminum. In this case, the conductor of the electric wire made of copper, which is a dissimilar metal, is bonded to the busbar made of aluminum.

In a connection structure for an electric wire with respect to the busbar above, when the busbar is made of aluminum, since a spring property is low, it is difficult to stably hold the electric wire by the extended portion. Therefore, a holding position of the electric wire with respect to the busbar is deviated in an axial direction or a radial direction. Thus, when the holding position of the electric wire with respect to the busbar is deviated, the conductor of the electric wire cannot be smoothly ultrasonically bonded to the busbar, and connection reliability may be lowered. In addition, when the busbar is made of copper, due to stress relaxation, a holding force of the electric wire by the extended portion is lowered, and holding of the electric wire may become unstable.

SUMMARY OF INVENTION

The present invention has been made in view of the above circumstances, and an object of the present invention is to provide a connection structure for an electric wire and a connection method of an electric wire in which the electric wire is stably held and well connected to a busbar.

In order to achieve the above object, a connection structure for an electric wire and a connection method of an electric wire according to the present invention include:

an electric wire having a conductor and an outer sheath covering the conductor;

a bonding member that is made of a conductive metal material and is attached to the electric wire; and a busbar made of a conductive metal material on which the bonding member is overlapped and ultrasonically bonded with the conductor interposed between the busbar and the bonding member.

The bonding member includes a crimping portion that crimps and fixes the electric wire.

According to the present embodiment, the connection method of an electric wire includes:

an electric wire fixing step of crimping and fixing a crimping portion provided on a bonding member made of a conductive metal material to an electric wire that exposes a conductor from an outer sheath; and a bonding step of overlapping and ultrasonically bonding the bonding member to a busbar made of a conductive metal material via the conductor.

The present invention has been briefly described as above. Details of the present invention is further clarified by reading a mode (hereinafter, referred to as "embodiment") for carrying out the invention described below with reference to attached drawings.

BRIEF DESCRIPTION OF DRAWINGS

FIGS. 7A and 7B are diagrams showing an electric wire fixing step in a connection method of an electric wire, and FIGS. 7A and 7B are side views of each work.

FIGS. 8A and 8B are diagrams showing a bonding step in the connection method of an electric wire, and FIGS. 8A and 8B are side views of each work.

DESCRIPTION OF EMBODIMENTS

A specific embodiment according to the present invention will be described below with reference to the drawings.

Figure 1:
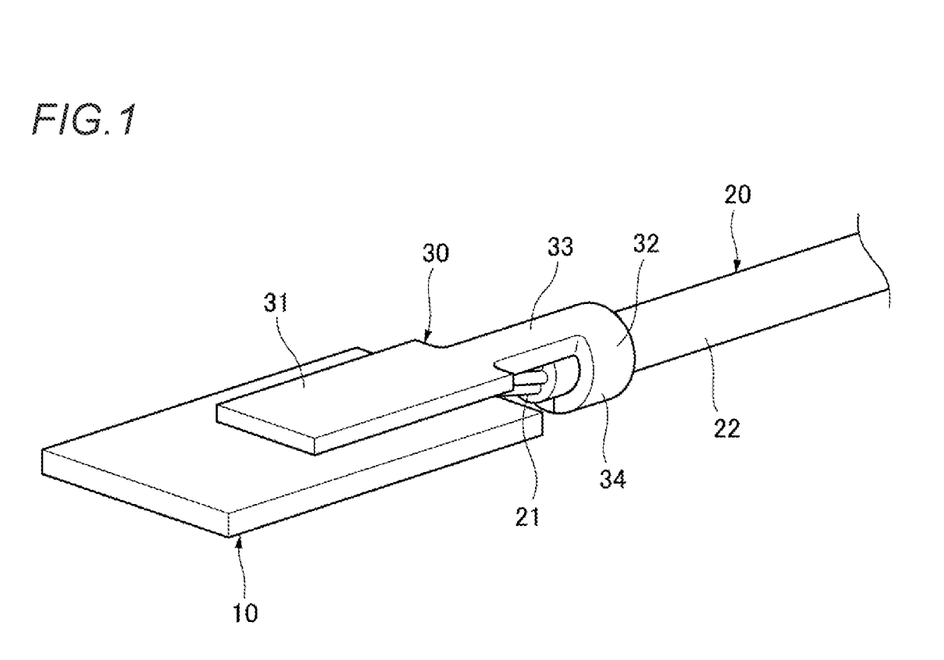
FIG. 1 is a perspective view of a connection portion between a busbar and an electric wire showing a connection structure for an electric wire according to the present embodiment.
Figure 2:
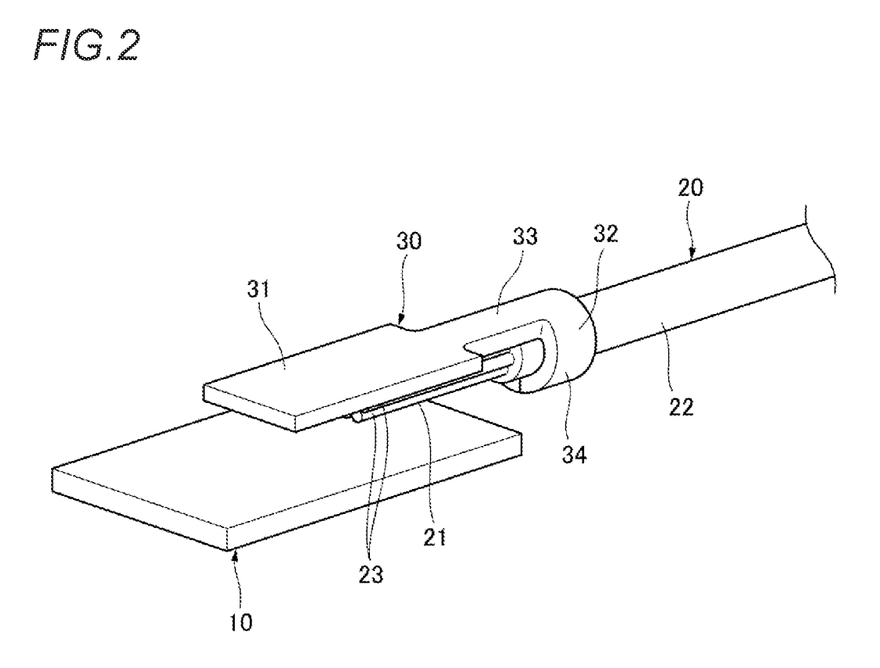
FIG. 2 is a perspective view of the connection portion between the busbar and the electric wire showing a state before a bonding member is bonded to the busbar.
Figure 3:
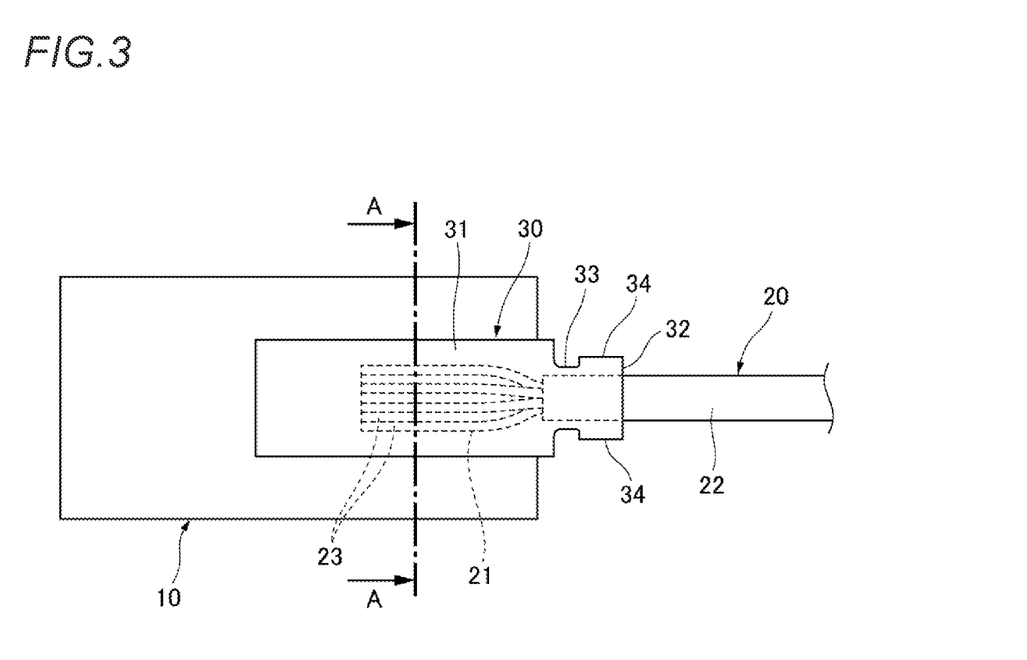
FIG. 3 is a plan view of the connection portion between the busbar and the electric wire showing the connection structure for an electric wire according to the present embodiment.

FIG. 1 is a perspective view of a connection portion between a busbar and an electric wire showing a connection structure for an electric wire according to the present embodiment. FIG. 2 is a perspective view of the connection portion between the busbar and the electric wire showing a state before a bonding member is bonded to the busbar. FIG. 3 is a plan view of the connection portion between the busbar and the electric wire showing the connection structure for an electric wire according to the present embodiment.

As shown in FIGS. 1 to 3, the connection structure for an electric wire according to the present embodiment is a connection structure between a busbar 10 and an electric wire 20. The electric wire 20 is connected to the busbar 10 by a bonding member 30.

The busbar 10 is made of, for example, copper, aluminum, or an aluminum alloy, and is formed in a plate shape. The busbar 10 is provided in, for example, a busbar module. The busbar module is, for example, assembled to a battery mounted on a vehicle or the like, and the busbar 10 is connected to an electrode of the battery.

The electric wire 20 includes a conductor 21 and an outer sheath 22. The conductor 21 is formed of, for example, a plurality of strands 23 made of copper, a copper alloy, aluminum, an aluminum alloy, or the like. The outer sheath 22 is made of an insulating synthetic resin, and an outer periphery of the conductor 21 is covered with the outer sheath 22.

Figure 4:
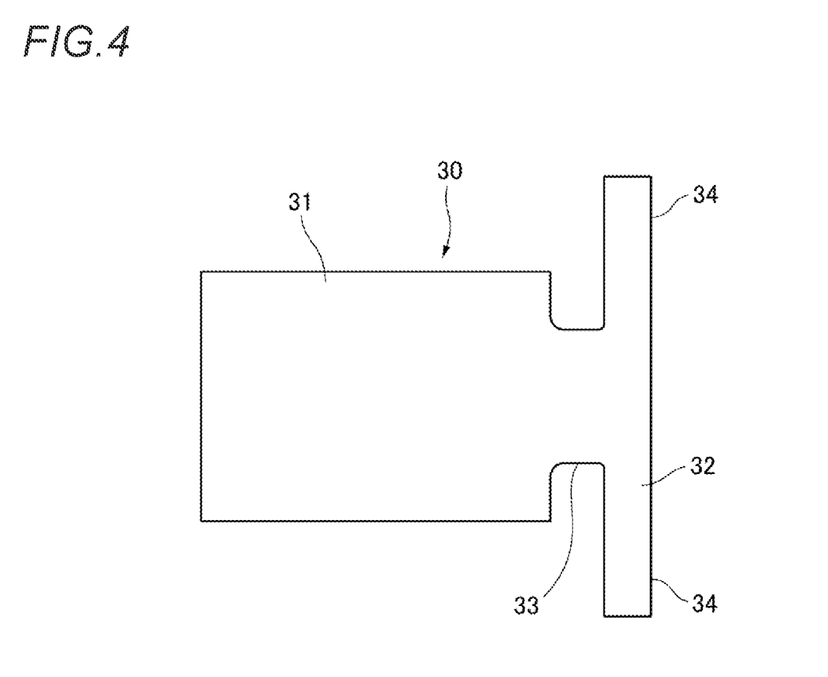
FIG. 4 is a plan view of the bonding member that connects the busbar and the electric wire.

FIG. 4 is a plan view of the bonding member that connects the busbar and the electric wire.

As shown in FIG. 4, the bonding member 30 includes a bonding plate portion 31 formed in a rectangular shape, a crimping portion 32 formed in a strip shape, and a connecting portion 33 connecting the bonding plate portion 31 and the crimping portion 32. The bonding member 30 is made of, for example, copper, a copper alloy, aluminum, an aluminum alloy, or the like, and is formed in a plate shape. The connecting portion 33 has a smaller width dimension than the bonding plate portion 31. The crimping portion 32 has a crimping piece 34 formed in a strip shape and having both ends protruding laterally from the bonding plate portion 31.

In an end portion of the electric wire 20, the outer sheath 22 is removed to expose the conductor 21. The bonding member 30 is attached to the end portion of the electric wire 20. In the bonding member 30, the crimping piece 34 of the crimping portion 32 is crimped to a portion of the outer sheath 22 of the electric wire 20. Accordingly, the bonding member 30 is attached to the end portion of the electric wire 20. Then, the conductor 21 of the electric wire 20 is provided along a surface of the bonding plate portion 31 in the bonding member 30 attached to the electric wire 20.

Figure 5:
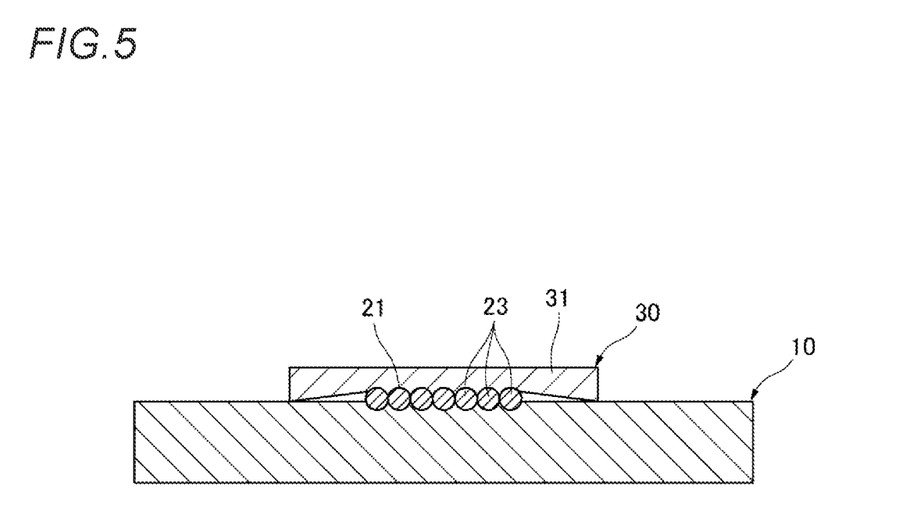
FIG. 5 is a cross-sectional view taken along a line A-A in FIG. 3.

FIG. 5 is a cross-sectional view taken along a line A-A in FIG. 3.

As shown in FIG. 5, the bonding member 30 is overlapped on the busbar 10 with a surface side of the bonding plate portion 31 provided with the conductor 21 of the electric wire 20 facing the busbar 10. The busbar 10 and the bonding plate portion 31 of the bonding member 30 are ultrasonically bonded with the conductor 21 interposed therebetween. The conductor 21 of the electric wire 20 interposed between the busbar 10 and the bonding plate portion 31 is ultrasonically bonded to the busbar 10 and the bonding plate portion 31 in a state in which the strands 23 are arranged in a surface direction of the busbar 10 and the bonding plate portion 31. Both side portions of the bonding member 30 may be bonded to the busbar 10.

In the connection structure for an electric wire of this structure, the conductor 21 of the electric wire 20 is conducted to both the busbar 10 and the bonding member 30. Therefore, for example, a current from the conductor 21 of the electric wire 20 flows directly or through the bonding member 30 to the busbar 10. That is, even if a bonding strength between the conductor 21 and the busbar 10 is weak, the current from the conductor 21 of the electric wire 20 flows to the busbar 10 via the bonding member 30. Therefore, high connection reliability between the busbar 10 and the conductor 21 of the electric wire 20 is obtained.

Here, a connection structure for an electric wire according to a reference example will be described.

Figure 6:
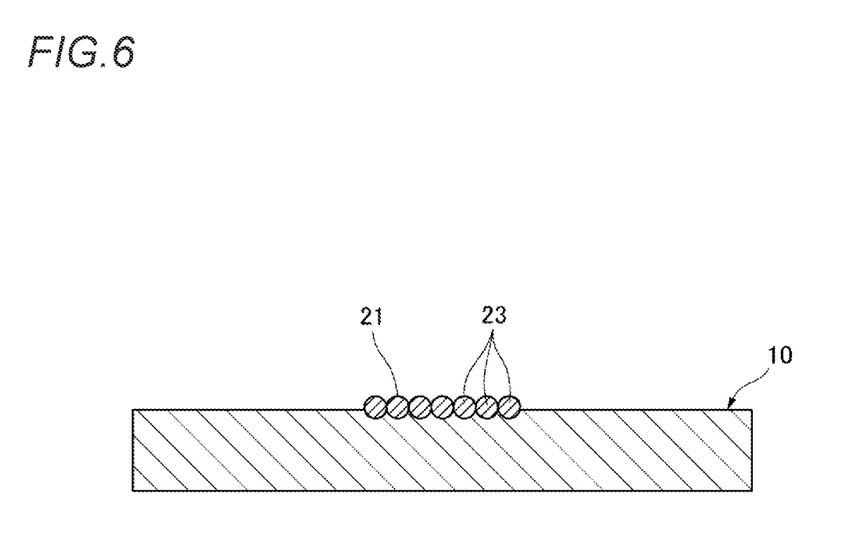
FIG. 6 is a cross-sectional view taken along a width direction of the connection portion between the busbar and the electric wire showing a connection structure for an electric wire according to a reference example.

FIG. 6 is a cross-sectional view taken along a width direction of the connection portion between the busbar and the electric wire showing the connection structure for an electric wire according to the reference example.

As shown in FIG. 6, in the connection structure for an electric wire according to the reference example, the conductor 21 of the electric wire 20 is ultrasonically bonded to a surface of the busbar 10, and the strands 23 of the conductor 21 are bonded side by side to the surface of the busbar 10. In this structure, the conductor 21 of the electric wire 20 is conducted only at a bonding portion with the busbar 10. Therefore, if the bonding strength at the bonding portion with the busbar 10 is weak, a conduction state between the busbar 10 and the conductor 21 of the electric wire 20 becomes unstable, and the high connection reliability may not be obtained.

In contrast, according to the connection structure for an electric wire according to the present embodiment, the electric wire 20 is crimped and fixed to the bonding member 30 ultrasonically bonded to the busbar 10 by the crimping portion 32 provided on the bonding member 30. That is, since the electric wire 20 is positioned and stably fixed to the bonding member 30 ultrasonically bonded to the busbar 10, the conductor 21 interposed between the busbar 10 and the bonding member 30 can be well conducted to the busbar 10, and the high connection reliability can be obtained. Moreover, since the conductor 21 does not directly contact a horn chip, damage to the conductor 21 can be prevented, and the conductor 21 can be uniformly bonded to the busbar 10 and the bonding member 30 to form a highly reliable connection structure.

In addition, when the bonding member 30 is made of copper or a copper alloy, it is possible to prevent a metal material of the bonding member 30 from being transferred to a contact surface of a horn, an anvil, or the like forming an ultrasonic bonding device when the busbar 10 and the bonding member 30 are ultrasonically bonded. Further, when the bonding member 30 is made of aluminum or an aluminum alloy, it is possible to prevent wear of the contact surface of the horn, the anvil, or the like forming the ultrasonic bonding device when the busbar 10 and the bonding member 30 are ultrasonically bonded.

Next, a connection method of an electric wire according to the present embodiment will be described.

Figure 7A:
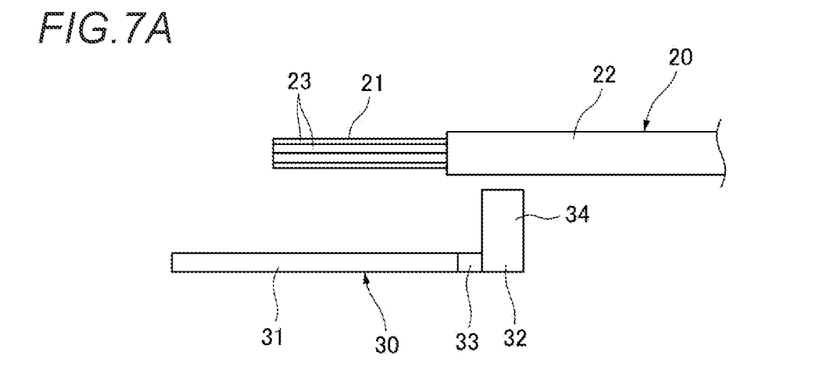
Figure 7B:
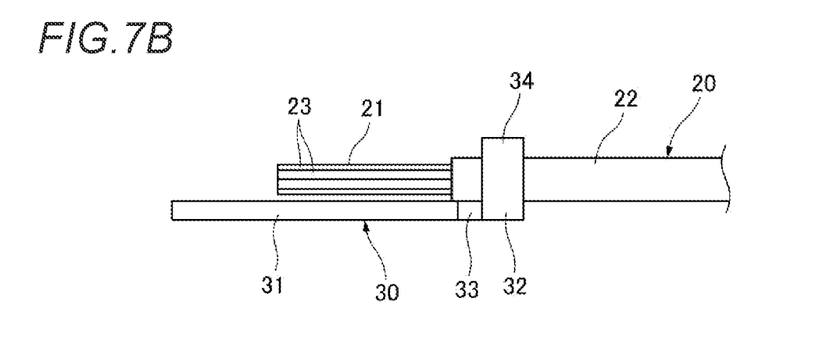
Figure 8A:
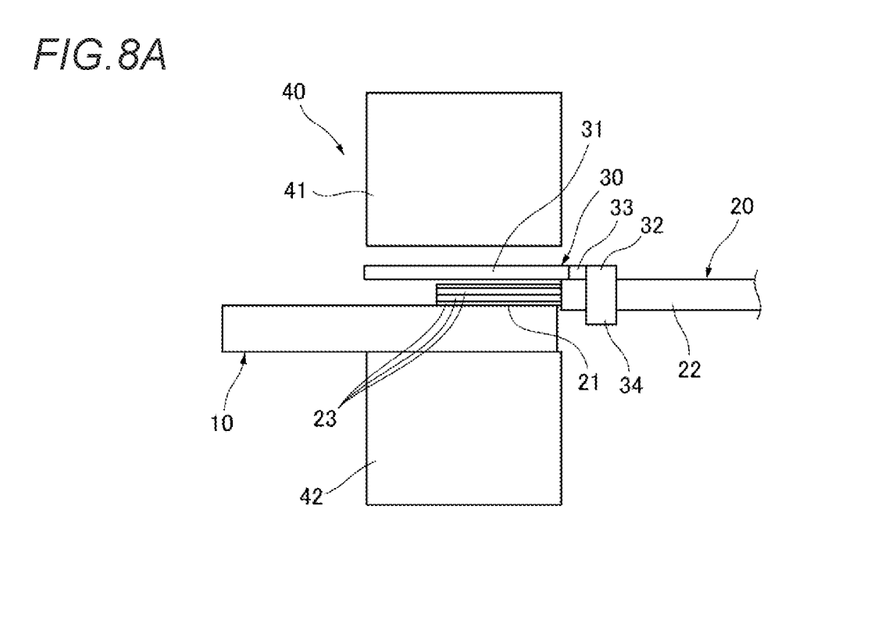
Figure 8B:
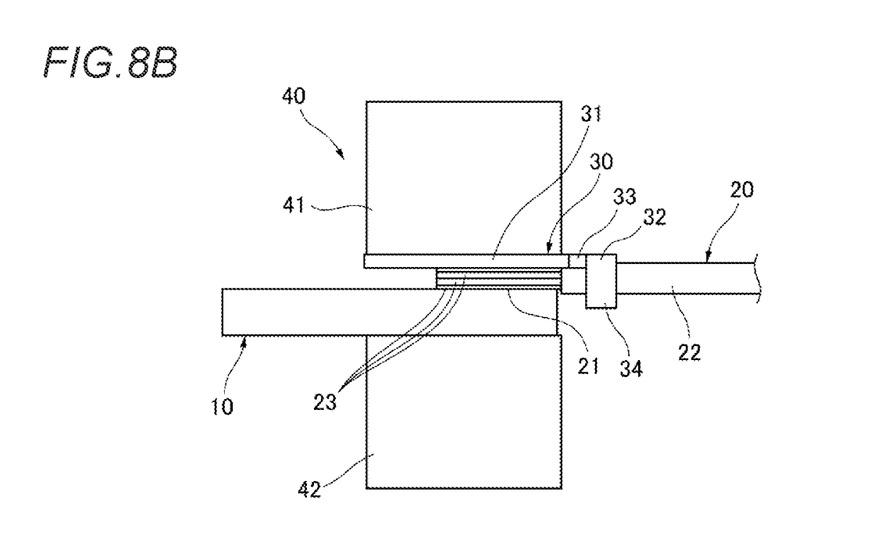

FIGS. 7A and 7B are diagrams showing an electric wire fixing step in the connection method of an electric wire, and FIGS. 7A and 7B are side views of each work. FIGS. 8A and 8B are diagrams showing a bonding step in the connection method of an electric wire, and FIGS. 8A and 8B are side views of each work.

(Electric Wire Fixing Step)

As shown in FIG. 7A, a terminal processing is performed on the electric wire 20, and the conductor 21 is exposed from the outer sheath 22 at the end portion of the electric wire 20. Then, the bonding member 30 is attached to the end portion of the electric wire 20 subjected to the terminal processing. Specifically, as shown in FIG. 7B, the conductor 21 of the electric wire 20 is provided along the surface of the bonding plate portion 31 of the bonding member 30, and the crimping piece 34 of the crimping portion 32 is crimped to a portion of the outer sheath 22 of the electric wire 20. Accordingly, the bonding member 30 is attached to the electric wire 20 subjected to the terminal processing.

(Bonding Step)

As shown in FIG. 8A, the busbar 10 and the bonding member 30 attached to the electric wire 20 are set in an ultrasonic bonding device 40. The ultrasonic bonding device 40 includes a horn 41 and an anvil 42, and the anvil 42 is disposed below the horn 41. Then, between the horn 41 and the anvil 42, the busbar 10 and the bonding plate portion 31 of the bonding member 30 attached to the end portion of the electric wire 20 are overlapped. At this time, the bonding member 30 places the surface side of the bonding plate portion 31 on which the conductor 21 of the electric wire 20 is provided on the busbar 10 toward the busbar 10. Accordingly, the busbar 10 and the bonding plate portion 31 are overlapped with each other via the conductor 21 of the electric wire 20.

The horn 41 includes a vibrator (not shown) that causes ultrasonic vibration by supplying an alternating current, and is vibrated by the vibrator. The horn 41 is moved up and down by a lifting and lowering mechanism (not shown) and is relatively close to and away from the anvil 42. The anvil 42 is a support portion on which the busbar 10 and the bonding plate portion 31 of the bonding member 30 are placed, and the horn 41 is a pressing portion that lowers and pressurizes the busbar 10 and the bonding plate portion 31 placed on the anvil 42.

As shown in FIG. 8B, the horn 41 is lowered, the busbar 10 and the bonding plate portion 31 are interposed and pressurized by the horn 41 and the anvil 42, and an alternating current is supplied to the vibrator in this pressurized state. Then, by ultrasonically vibrating the horn 41 by the vibrator, ultrasonic vibration energy is propagated to the busbar 10 and the bonding plate portion 31 of the bonding member 30 overlapped via the conductor 21. Accordingly, the busbar 10 and the bonding plate portion 31 of the bonding member 30 are ultrasonically bonded with the conductor 21 interposed therebetween. The conductor 21 of the electric wire 20 interposed between the busbar 10 and the bonding plate portion 31 is ultrasonically bonded to the busbar 10 and the bonding plate portion 31 in a state in which the strands 23 are arranged in the surface direction of the busbar 10 and the bonding plate portion 31. Thereafter, the horn 41 is raised, and the busbar 10 bonded to the end portion of the electric wire 20 via the bonding member 30 is taken out from between the horn 41 and the anvil 42.

Thus, according to the connection method of an electric wire according to the above embodiment, since the crimping portion 32 provided in the bonding member 30 is positioned and fixed by crimping the crimping portion 32 to the electric wire 20, and the bonding member 30 is overlapped and ultrasonically bonded to the busbar 10 via the conductor 21 of the electric wire 20, the conductor 21 interposed between the busbar 10 and the bonding member 30 can be well conducted to the busbar 10, and the high connection reliability can be obtained. Moreover, since the conductor 21 is not directly brought into contact with the horn chip, the conductor 21 can be uniformly bonded to the busbar 10 and the bonding member 30 while preventing damage to form a highly reliable connection structure.

The crimping portion 32 may crimp a portion of the conductor 21 instead of the outer sheath 22, or may crimp the outer sheath 22 and the conductor 21.

Next, modifications will be described.
(First Modification)
FIG. 9 is a cross-sectional view showing the bonding member according to a first modification, and is a cross section at the same position as the A-A line in FIG. 3.

Figure 9:
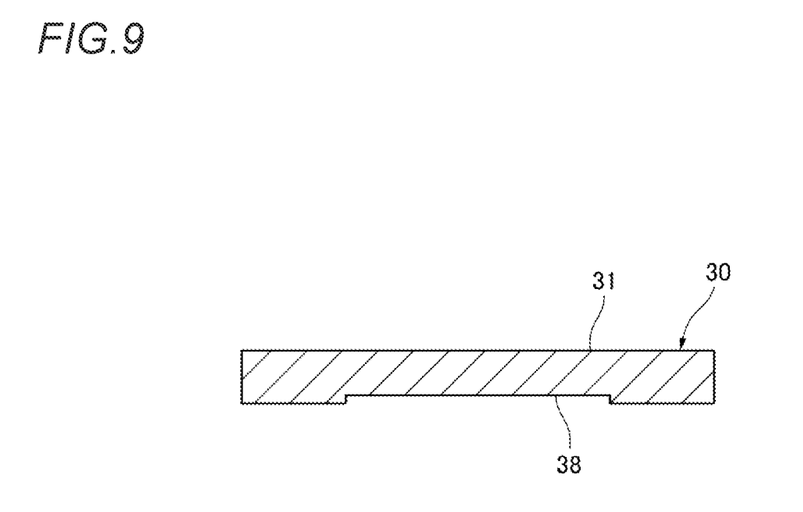
FIG. 9 is a cross-sectional view showing the bonding member according to a first modification.

As shown in FIG. 9, in the first modification, a concave portion 38 is formed on the surface side of the bonding plate portion 31 in which the conductor 21 of the electric wire 20 is provided. Accordingly, when the busbar 10 and the bonding plate portion 31 are overlapped with each other via the conductor 21 of the electric wire 20, it is possible to prevent the conductor 21 of the electric wire 20 from being deviated from a desired position on the bonding plate portion 31.

Figure 10:
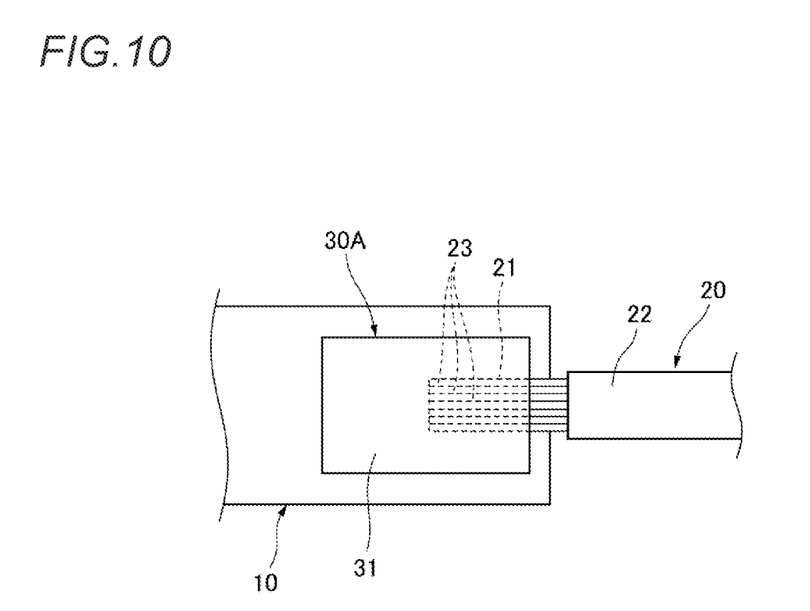
FIG. 10 is a plan view showing a connection structure for an electric wire according to a second modification.

(Second Modification)
FIG. 10 is a plan view showing a connection structure for an electric wire according to a second modification.

As shown in FIG. 10, in the second modification, a bonding member 30A without the crimping portion 32 and the connecting portion 33 is used. In the second modification, the bonding member 30A itself is the bonding plate portion 31, and the bonding plate portion 31, which is the bonding member 30A, is ultrasonically bonded to the busbar 10 via the conductor 21 of the electric wire 20. Accordingly, the conductor 21 of the electric wire 20 interposed between the busbar 10 and the bonding plate portion 31 is ultrasonically bonded to the busbar 10 and the bonding plate portion 31 in the state in which the strands 23 are arranged in the surface direction of the busbar 10 and the bonding plate portion 31.

Figure 11:
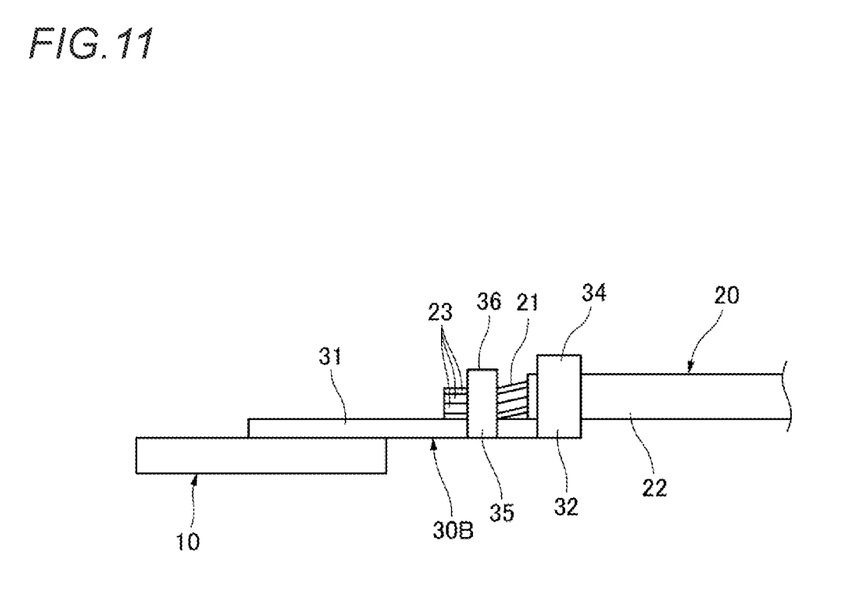
FIG. 11 is a side view showing a connection structure for an electric wire according to a third modification.

(Third Modification)
FIG. 11 is a side view showing a connection structure for an electric wire according to a third modification.

As shown in FIG. 11, in the third modification, a bonding member 30B including a crimping portion 35 that crimps the conductor 21 of the electric wire 20 together with the crimping portion 32 that crimps the outer sheath 22 of the electric wire 20 is used. The crimping portion 35 that crimps the conductor 21 includes a pair of crimping pieces 36. In the second modification, the outer sheath 22 of the electric wire 20 is crimped by the crimping piece 34 of the crimping portion 32 of the bonding member 30B. Further, the conductor 21 of the electric wire 20 is crimped by the crimping pieces 36 of the crimping portion 35 of the bonding member 30B, so that the bonding member 30B and the conductor 21 of the electric wire 20 are conducted. The bonding plate portion 31 of the bonding member 30B to which the electric wire 20 is connected is ultrasonically bonded to the busbar 10, and is directly connected to the busbar 10 so as to be conducted. Accordingly, the conductor 21 of the electric wire 20 is electrically connected to the busbar 10 via the bonding member 30B.

The present invention is not limited to the above embodiment, and modifications, improvements, and the like can be made as appropriate. In addition, materials, shapes, sizes, numbers, arrangement places and the like of elements in the above-described embodiment are optional and not limited as long as the object of the present invention can be achieved.

Here, characteristics of the connection structure for an electric wire and the connection method of an electric wire according to the embodiment of the present invention above will be briefly summarized in the following [1] to [4].

[1] A connection structure for an electric wire, the connection structure includes:
an electric wire (20) that has a conductor (21) and outer sheath (22) covering the conductor;
a bonding member (30) that is made of a conductive metal material and is attached to the electric wire (20); and
a busbar (10) that is made of a conductive metal material on which the bonding member (30) is overlapped and ultrasonically bonded with the conductor (21) interposed between the busbar (10) and the bonding member (30), in which
the bonding member (30) includes a crimping portion (32) that crimps and fixes the electric wire (20).

[2] The connection structure for an electric wire according to [1], in which the bonding member (30) is made of copper or a copper alloy.

[3] The connection structure for an electric wire according to [1], in which the bonding member (30) is made of aluminum or an aluminum alloy.

[4] A connection method of an electric wire, the connection method includes:

an electric wire fixing step of crimping and fixing a crimping portion (32) provided on a bonding member (30) made of a conductive metal material to an electric wire (20) that exposes a conductor (21) from an outer sheath (22); and a bonding step of overlapping and ultrasonically bonding the bonding member (30) to a busbar (10) made of a conductive metal material via the conductor (21).

According to the connection structure for an electric wire having the configuration of [1], the electric wire is crimped and fixed to the bonding member ultrasonically bonded to the busbar by the crimping portion provided on the bonding member. That is, since the electric wire is positioned and stably fixed to the bonding member ultrasonically bonded to the busbar, the conductor interposed between the busbar and the bonding member can be well conducted to the busbar, and high connection reliability can be obtained. Moreover, since the conductor does not directly contact a horn chip, damage to the conductor can be prevented, and the conductor can be uniformly bonded to the busbar and the bonding member to form a highly reliable connection structure.

According to the connection structure for an electric wire having the configuration of [2], it is possible to prevent a metal material of the bonding member from being transferred to a contact surface of a horn, an anvil, or the like forming an ultrasonic bonding device when the busbar and the bonding member are ultrasonically bonded.

According to the connection structure for an electric wire having the configuration of [3], it is possible to prevent wear of the contact surface of the horn, the anvil, or the like forming the ultrasonic bonding device when the busbar and the bonding member are ultrasonically bonded.

According to the connection method of an electric wire having the configuration of [4], since the crimping portion provided in the bonding member is positioned and fixed by crimping the crimping portion to the electric wire, and the bonding member is overlapped and ultrasonically bonded to the busbar via the conductor of the electric wire, the conductor interposed between the busbar and the bonding member can be well conducted to the busbar, and the high connection reliability can be obtained. Moreover, since the conductor does not directly contact with the horn chip, the conductor can be uniformly bonded to the busbar and the bonding member while preventing damage to form a highly reliable connection structure.

According to the present invention, it is possible to provide a connection structure for an electric wire and a connection method of an electric wire in which the electric wire is stably held and well connected to a busbar.

What is claimed is:

1. A connection structure for an electric wire, the connection structure comprising:

an electric wire that has a conductor and an outer sheath covering the conductor;

a bonding member that is made of a conductive metal material and is attached to the electric wire; and a busbar that is made of a conductive metal material and on which the bonding member is overlapped and ultrasonically bonded with the conductor interposed between the busbar and the bonding member, wherein the bonding member includes a crimping portion that crimps and fixes the electric wire.

2. The connection structure for an electric wire according to claim 1, wherein the bonding member is made of copper or a copper alloy.

3. The connection structure for an electric wire according to claim 1, wherein the bonding member is made of aluminum or an aluminum alloy.

4. A connection method of an electric wire, the connection method comprising:

an electric wire fixing step of crimping and fixing a crimping portion provided on a bonding member made of a conductive metal material to an electric wire exposing a conductor from an outer sheath; and a bonding step of overlapping and ultrasonically bonding the bonding member to a busbar made of a conductive metal material via the conductor.

* * * * *